Patented Mar. 31, 1936

2,035,453

UNITED STATES PATENT OFFICE 2,035,453

TREATING IMPURE ANTIMONY TRIOXIDE

Jesse O. Betterton, Metuchen, and Roy D. McLellan, Woodbridge, N. J., assignors to American Smelting and Refining Company, New York, N. Y., a corporation of New Jersey No Drawing. Application July 29, 1932, Serial No. 626,202

9 Claims. (Cl. 23—144)

This invention relates to the treatment of impure and off-color antimony trioxide for the production of high grade antimony trioxide of a distinctly improved quality, the new product being markedly superior in purity and whiteness of color to the products ordinarily offered on the market.

For the production of white antimony trioxide in a high state of purity according to the present invention, impure off-grade antimony trioxide is placed in a suitable furnace or other receptacle and heated to volatilization temperatures in the presence of a moving atmosphere which preferably is neutral, but which may be of a slightly oxidizing nature. As a result, antimony trioxide of high purity is sublimated into the moving atmosphere and may be recovered by condensation and filtration. The temperature range in which the invention may be successfully practiced is of wide latitude, as sublimation is noticeable below the melting temperature, 654° C., of antimony trioxide and is very rapid at temperatures substantially below the theoretical boiling point of 1456° C.

Suitable gases which may be employed are carbon dioxide, nitrogen, and combustion gases containing nitrogen, carbon dioxide and water vapor with or without small and restricted amounts of oxygen, but which carry no solid matter in suspension. Waste heat gases containing solid matter in suspension may be used if suitably filtered. While the particular gas used should be neutral, it is often desirable from an operating standpoint to utilize a gas which is slightly oxidizing in nature in order to guard against reducing conditions and thereby insure purity of product. While it is impossible to obtain the antimony trioxide in the desired state of purity in ordinary air, we have found the gas may contain small amounts of oxygen up to approximately 5% or slightly more but in any event the gas used must, with respect to its free oxygen content, fall within the critical range of neutral (substantially 0%) to moderately oxidizing (not more than 7%).

By subliming the antimony trioxide in this manner, the impurities in the impure material are left behind while the volatilized, purified and whitened product may be suitably recovered, as, for example, in condensing chambers and final filtration through cloth bags.

It is important to note that in producing the purified white antimony trioxide, the quantity volatilized is directly proportional to the volume of the sweeping gas used.

Suitable apparatus for practicing the present invention will readily suggest itself to those skilled in the art. Ordinarily, this equipment will consist of such essentials as a furnace, flue and bag house. The furnace for treating the crude antimony trioxide will preferably consist of a muffle, retort, tube, pan or kettle externally heated by suitable means, such as gas, oil, coal, coke, etc. It may, however, if desired, consist of a hearth, such as a reverberatory or cupel furnace or the like, and be heated by passing gases from the combustion of various carbonaceous fuels over the crude antimony trioxide on the hearth. Any other suitable means may be provided for passing controlled quantities of the various gases desired in the moving gaseous atmosphere contacting with the material being treated.

The flue may be of uniform section of brick and/or steel of suitable dimensions with or without condensation chambers, goose neck settlers, towers, and other common well known devices employed in the selective settling of sublimed materials. The bag house may consist of an ordinary cloth bag which is in common use in filtering and recovering fumes and subliming solids. If desired, the Cottrell process may be employed as well as other well known filtering means.

It will be appreciated that the present invention provides a method whereby high grade, white antimony oxide may be obtained from impure and off-grade antimony trioxide. It is also to be noted that this product cannot be produced by the methods ordinarily employed for the purification of arsenious oxide. All attempts to apply the sublimation process ordinarily utilized in the refining of arsenious oxides have met with failure in the antimony trioxide field. While we cannot positively explain the failure of the ordinary arsenious oxide process when applied to the purification of antimony trioxide, we believe this failure may be partially accounted for in the light of our present invention. Our results lead us to believe that, when attempts are made to sublime antimony trioxide in an atmosphere containing considerable oxygen, the particles of antimony trioxide become coated with films of non-volatile antimony antimonate and lead antimonate (if lead is present in the impure antimony trioxide). We believe the formation of this film results in suppressing the sublimation of the antimony trioxide. However, there are probably other factors which are not as yet fully understood which render the purification of impure antimony trioxide in ordinary atmospheres impossible.

While certain novel features of the invention have been disclosed and are pointed out in the annexed claims, it will be understood that various omissions, substitutions and changes may be made by those skilled in the art without departing from the spirit of the invention.

What is claimed is:

1. The process for obtaining white antimony trioxide in a pure state from impure antimony trioxide which consists in heating impure antimony trioxide sufficiently to effect volatilization and sweeping same with a substantially neutral gas whereby antimony trioxide of desired purity and color is sublimated and separated from the impurities present.

2. The process of treating off-grade antimony trioxide for the production of high-grade white antimony trioxide which consists in heating such off-grade antimony trioxide to volatilization temperatures in a suitable receptacle and in the presence of a moving atmosphere of neutral to moderately oxidizing gas whereby relatively pure antimony trioxide is volatilized, condensing the vapor and suitably recovering purified antimony trioxide.

3. In the treatment of impure antimony trioxide, the improvement which consists in subjecting the impure compound to sublimation in the presence of a moving, neutral to moderately oxidizing gaseous atmosphere.

4. The process for treating impure antimony trioxide which consists in subjecting quantities of such compound to sublimation temperatures in the presence of a substantially neutral atmosphere containing nitrogen and carbon dioxide as a major constituent thereby effecting a separation of antimony trioxide from impurities and subsequently recovering white antimony trioxide from said atmosphere by suitable means of condensation and separation.

5. In the treatment of impure antimony trioxide the improvement which consists in heating the impure compound sufficiently to effect volatilization of antimony trioxide and sweeping same with a neutral to slightly oxidizing atmosphere.

6. In the sublimation of antimony trioxide from off-grade antimony trioxide in the presence of a sweeping, substantially neutral gaseous atmosphere, the improvement which consists in regulating the quantity of purified antimony trioxide formed by suitably controlling the volume of sweeping gas passed in contact with the impure antimony trioxide.

7. The process for producing pure antimony trioxide which comprises subliming impure antimony trioxide in the presence of a neutral to slightly oxidizing atmosphere, maintaining conditions of sublimation such that the formation of non-volatile antimony compounds is substantially prevented and collecting the sublimed antimony trioxide.

8. The process for producing pigment antimony trioxide which comprises subliming antimony trioxide from a charge of off-color antimony trioxide while maintaining a moving, neutral to moderately oxidizing atmosphere in contact therewith.

9. The process for treating impure antimony trioxide which consists in subjecting quantities of such compound to sublimation temperatures in the presence of a substantially neutral atmosphere containing a gas selected from the group consisting of nitrogen and carbon dioxide as a major constituent thereby effecting a separation of antimony trioxide from impurities and subsequently recovering white antimony trioxide from said atmosphere by suitable means of condensation and separation.

JESSE O. BETTERTON.
ROY D. McLELLAN.